(12) United States Patent
Ji (10) Patent No.: US 11,219,198 B2
(45) Date of Patent: Jan. 11, 2022

(54) FISHING APPRATUS AND METHOD FOR CONTROLLING THE SAME (71) Applicant: BOE TECHNOLOGY GROUP CO., LTD., Beijing (CN)

(72) Inventor: Chunyan Ji, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 730 days.

(21) Appl. No.: 16/021,453

(22) Filed: Jun. 28, 2018

(65) Prior Publication Data

US 2019/0045765 A1 Feb. 14, 2019

(30) Foreign Application Priority Data

Aug. 14, 2017 (CN) .......................... 201710692146.0

(51) Int. Cl.
*A01K 87/00* (2006.01)
*A01K 89/017* (2006.01)
(Continued)

(52) U.S. Cl.
CPC ............ *A01K 87/007* (2013.01); *A01K 89/00* (2013.01); *A01K 89/012* (2013.01);
(Continued)

(58) Field of Classification Search
CPC ...... A01K 87/00; A01K 87/007; A01K 93/02; A01K 97/00; A01K 97/01; A01K 97/12;
(Continued)

(56) References Cited

U.S. PATENT DOCUMENTS 4,339,888 A * 7/1982 Sheng-Jung ........... A01K 91/02
  43/26.1
4,378,652 A * 4/1983 Lindgren ............... A01K 91/10
  43/26.1
(Continued)

FOREIGN PATENT DOCUMENTS

CN 201403425 Y 2/2010
CN 103736284 A 4/2014
(Continued)

OTHER PUBLICATIONS

Second Office Action for Chinese Patent Application No. 201710692146.0 dated Aug. 9, 2019.
(Continued)

*Primary Examiner* — Thanh Pham
(74) *Attorney, Agent, or Firm* — Calfee, Halter & Griswold LLP (57) ABSTRACT

A fishing apparatus and a method for controlling the same. The fishing apparatus includes: a fishing rod having a reel and a motor connected with the reel; a brainwave collection unit arranged to collect a brainwave signal from a user of the fishing apparatus; and a control unit arranged to receive the brainwave signal collected by the brainwave collection unit. The apparatus generates a motor control signal according to the brainwave signal and transmits the motor control signal to the motor. The motor drives the reel to rotate under the control of the motor control signal. The fishing apparatus and the method for controlling the same as provided by the present disclosure are easy to use and labor-saving.

17 Claims, 4 Drawing Sheets

(51) Int. Cl.
*G05D 13/62* (2006.01)
*A01K 89/00* (2006.01)
*G05D 13/00* (2006.01)
*A01K 89/01* (2006.01)
*A01K 89/012* (2006.01)
*G06F 3/01* (2006.01)

(52) U.S. Cl.
CPC ........ A01K 89/0105 (2013.01); A01K 89/017 (2013.01); G05D 13/00 (2013.01); G05D 13/62 (2013.01); *A61H 2230/00* (2013.01); *A61H 2230/10* (2013.01); *G06F 3/011* (2013.01); *G06F 3/015* (2013.01); *G06F 2203/011* (2013.01)

(58) Field of Classification Search
CPC ........ A01K 91/00; A01K 91/02; A01K 91/06; A01K 89/00; A01K 89/017; A01K 89/0172
See application file for complete search history.

(56) References Cited

U.S. PATENT DOCUMENTS

| | | | | |
|---|---|---|---|---|
| 4,752,878 | A * | 6/1988 | Sigurdsson | A01K 89/017 43/15 |
| 7,008,086 | B1 * | 3/2006 | Kell | A01K 97/01 362/191 |
| 2005/0137493 | A1 * | 6/2005 | Ryu | G06F 3/015 600/544 |
| 2008/0289242 | A1 * | 11/2008 | Cecil | A01K 97/125 43/18.1 R |
| 2009/0318826 | A1 * | 12/2009 | Green | A61B 5/0006 600/545 |
| 2010/0000143 | A1 * | 1/2010 | Pekin | A01K 89/00 43/17 |
| 2011/0118636 | A1 * | 5/2011 | Kitamura | 601/84 |
| 2011/0278860 | A1 * | 11/2011 | Lupinacci | A01K 87/007 290/1 R |
| 2011/0298706 | A1 * | 12/2011 | Mann | H04W 4/02 345/157 |
| 2013/0227873 | A1 * | 9/2013 | Coulson | A01K 97/01 43/17 |
| 2015/0033611 | A1 | 2/2015 | Hamilton, II | |
| 2017/0225701 | A1 * | 8/2017 | Kraus | B62B 3/14 |
| 2018/0160982 | A1 * | 6/2018 | Laszlo | A61B 5/7225 |

FOREIGN PATENT DOCUMENTS

| | | |
|---|---|---|
| CN | 205235396 U | 5/2016 |
| CN | 106730796 A | 5/2017 |
| CN | 107027724 A | 8/2017 |

OTHER PUBLICATIONS

First Office Action for Chinese Patent Application No. 201710692146.0 dated Mar. 11, 2019.

* cited by examiner

FISHING APPRATUS AND METHOD FOR CONTROLLING THE SAME

RELATED APPLICATIONS

The present application claims the benefit of Chinese Patent Application No. 201710692146.0, filed on Aug. 14, 2017, the entire disclosure of which is incorporated herein by reference.

FIELD

The present disclosure relates to the technical field of fishing tackle, and more particularly to a fishing apparatus and a method for controlling the same.

BACKGROUND ART

Many people love fishing. Current new fishing tools emerge constantly, and have made great progress compared with those used decades ago. Some fishing rods are retractable or deployable such that a fishing line may be laid down in a nearer or further place.

With current fishing tools, a user who throws baits needs to retrieve fishing line at a slow and uniform speed so as to attract fish to bite. During fishing, a user has to take a close look at the tail portion of a fishing rod to observe whether a fish bites the hook, which needs high concentration of attention. A common fishing rod may be quite laborious as the user has to frequently cast a fishing rod and retrieve a fishing line, such that the user is very tired, which will also affect the user's attention to fish.

SUMMARY

According to the first aspect of the embodiment of the present disclosure, there is provided a fishing apparatus. The fishing apparatus comprises a fishing rod having a reel and a motor connected with the reel; a brainwave collection unit being arranged to collect a brainwave signal from a user of the fishing apparatus; and a control unit being arranged to receive the brainwave signal collected by the brainwave collection unit, generating a motor control signal according to the brainwave signal, and transmitting the motor control signal to the motor. The motor drives the reel to rotate under the control of the motor control signal.

In certain exemplary embodiments, the motor control signal comprises a first control signal for controlling the motor to drive the reel to rotate uni-directionally. The control unit is arranged to calculate a proportion of beta ($\beta$) wave in the brainwave signal according to the collected brainwave signal, and to generate the first control signal when the proportion of $\beta$ wave reaches a first preset proportion threshold.

In certain exemplary embodiments, the motor control signal comprises a motor rotational speed signal indicative of the rotational speed of the motor and/or a motor rotational mode signal indicative of the rotational mode of the motor.

In certain exemplary embodiments, the first preset proportion threshold is obtained by: training the user to control unidirectional rotation of the reel with mind, collecting and processing brainwave signals of the user during the training, calculating proportions of $\beta$ wave in brainwave signals collected when the user is controlling the rotation of the reel, and using the minimum of the proportions of $\beta$ wave as the first preset proportion threshold.

In certain exemplary embodiments, the control unit is further arranged to change the information indicative of the rotational speed of the motor according to the difference between the proportion of $\beta$ wave and the first preset proportion threshold.

In certain exemplary embodiments, the motor control signal comprises a second control signal used to control the motor to drive the reel to rotate reciprocally between a forward direction and a reverse direction, and the control unit is further arranged to generate the second control signal when proportions of $\beta$ wave reciprocally change centered around a second preset proportion threshold.

In certain exemplary embodiments, the second preset proportion threshold is obtained by: training the user to control reciprocal rotation of the reel with their mind, collecting and processing brainwave signals of the user during the training, calculating proportions of $\beta$ wave in brainwave signals collected when the user is controlling the reciprocal rotation of the reel, and using the mean value of the proportions of $\beta$ wave as the second preset proportion threshold.

In certain exemplary embodiments, the brainwave collection unit comprises at least two head-mounted electrodes, being arranged to, when mounted on the user's head, collect a brainwave of the user; a processing unit being arranged to receive the brainwave collected by the head-mounted electrodes and process the brainwave to obtain the brainwave signal; and a wireless communication unit being arranged to receive the brainwave signal from the processing unit and transmit the brainwave signal to the control unit through wireless connection with the control unit.

In certain exemplary embodiments, the fishing apparatus further comprises a battery unit and an electric generator unit. The battery unit is arranged to provide power to the fishing apparatus. The electric generator unit connects with the reel and electrically connected with the battery unit, and is arranged to convert mechanical energy generated by rotation of the reel to electrical energy so as to be stored in the battery unit.

In certain exemplary embodiments, the fishing apparatus further comprises a first sensor unit and a switching unit. The first sensor unit is disposed on the reel and electrically connected with the control unit, and is arranged to generate a first sensor signal when it senses griping of a handle of the reel by the user, and transmit the first sensor signal to the control unit. The control unit is arranged to send a third control signal to the switching unit according to the first sensor signal. The switching unit is disposed between the electric generator unit and the reel, and is arranged to connect the electric generator unit with the reel in response to the third control signal of the control unit.

In certain exemplary embodiments, the fishing apparatus further comprises a second sensor unit and a light-emitting unit. The second sensor unit is disposed at an end of the fishing rod extending to a water surface, and is arranged to generate a second sensor signal when it sense that a fishing line of the fishing apparatus is being tugged and to transmit the second sensor signal to the control unit. The control unit is arranged to send a fourth control signal to the light-emitting unit according to the second sensor signal. The light-emitting unit is disposed on an external surface of the fishing rod, and is arranged to emit light in response to the fourth control signal.

In certain exemplary embodiments, the light-emitting unit comprises a plurality of LEDs disposed on the external surface of the fishing rod and around it. The control unit is arranged to calculate the current tug strength on the fishing line according to the second sensor signal, determine the number of LEDs to be lit according to the calculated tug strength, and send the fourth control signal to one or more corresponding LEDs.

In certain exemplary embodiments, the control unit is arranged to calculate a proportion of theta (θ) wave in the brainwave signal according to the collected brainwave signal, and sends the fourth control signal to the light-emitting unit according to the second sensor signal only if the proportion of the θ wave reaches a third preset proportion threshold.

According to a second aspect of the embodiment of the present disclosure, there is provided a method for controlling a fishing apparatus, which comprises a fishing rod having a reel and a motor connected with the reel. The method comprises the steps of receiving a brainwave signal of a user of the fishing apparatus collected by a brainwave collection unit of the fishing apparatus; generating a motor control signal according to the brainwave signal; and transmitting the motor control signal to the motor so that the motor drives the reel to rotate under the control of the motor control signal.

In certain exemplary embodiments, the motor control signal comprises a first control signal for controlling the motor to drive the reel to rotate uni-directionally. The method further comprises: calculating a proportion of β wave in the brainwave signal according to the collected brainwave signal; and generating the first control signal when the proportion of β wave reaches a first preset proportion threshold.

In certain exemplary embodiments, the motor control signal comprises a second control signal used to control the motor to drive the reel to rotate reciprocally between a forward direction and a reverse direction. The method further comprises: generating the second control signal when proportions of β wave reciprocally change centered around a second preset proportion threshold.

In certain exemplary embodiments, the method further comprises: sending a third control signal in response to a first sensor signal generated by a first sensor disposed on the reel so as to instruct a switching unit of the fishing apparatus to connect an electric generator unit with the reel for converting mechanical energy to electrical energy. The first sensor generates the first sensor signal when it senses griping of a handle of the reel by the user.

In certain exemplary embodiments, the method further comprises: sending a fourth control signal in response to a second sensor signal generated by a second sensor disposed at an end of the fishing rod extending to a water surface so as to instruct a light-emitting unit disposed on an external surface of the fishing rod to emit light. The second sensor generates the second sensor signal when it senses that a fishing line of the fishing apparatus is being tugged.

In certain exemplary embodiments, the method further comprises: calculating a proportion of θ wave in the brainwave signal; and sending the fourth control signal only if the proportion of the θ wave reaches a third preset proportion threshold.

According to a third aspect of the embodiment of the present disclosure, there is provided a computer program product, comprising a computer readable storage medium for storing an instruction, and the instruction when executed enables at least one central processing unit of a computing device to carry out the method for controlling a fishing apparatus according the second aspect of the invention.

DETAILED DESCRIPTION

For the purpose of making the objects, technical solutions and advantages of the present disclosure clearer, the present disclosure will be further explained in detail in view of the embodiments and with reference to the drawings.

It shall be noted that all the terms, such as "first", "second" or "third" etc., used in the embodiments of the present disclosure are to distinguish two dissimilar objects or dissimilar parameters having the same names. It can be seen that the terms, such as "first", "second" or "third" etc., are just to facilitate expression, and should not be understood as limitations to the embodiments of the present disclosure, which will not be reiterated in the following embodiments.

Figure 1:
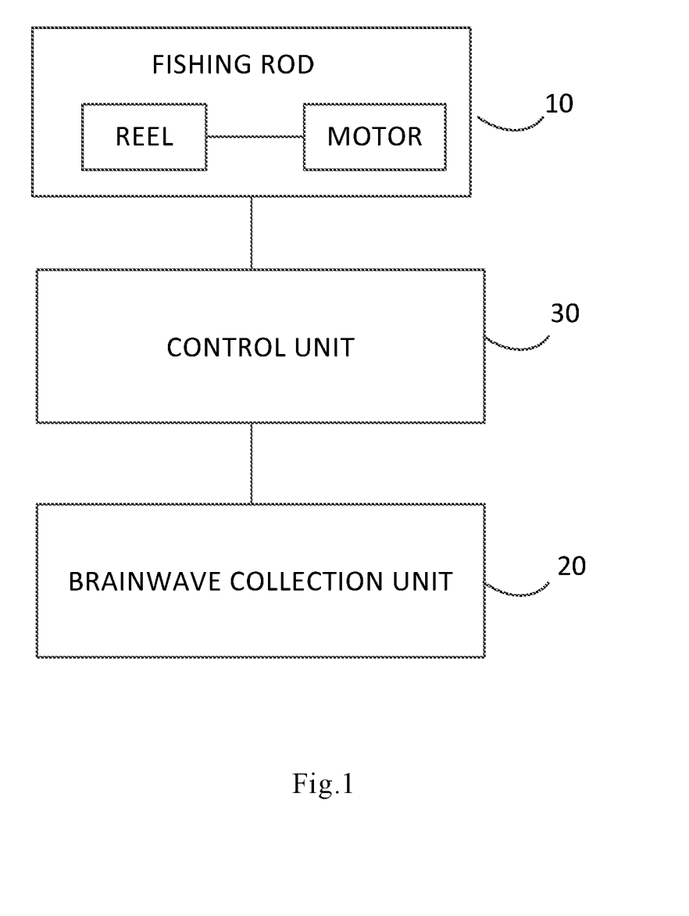
FIG. 1 is a structural schematic view of a fishing apparatus according to an embodiment of the present disclosure.

According to the first aspect of the embodiment of the present disclosure, there is provided an embodiment of a fishing apparatus, which is easy to use and labor-saving. FIG. 1 is a structural schematic view of a fishing apparatus according to an embodiment of the present disclosure.

As shown, the fishing apparatus comprises a fishing rod 10, a brainwave collection unit 20 and a control unit 30. The fishing rod 10 comprises a reel 11 and a motor 12 connected with the reel 11. The motor 12 may drive the reel 11 in rotation to retrieve and deploy a fishing line. In certain exemplary embodiments, the main body of the fishing rod 10 is a hollow rod body. The rod body may be made of any suitable material, such as glass fiber or carbon fiber. The motor 12 is disposed within the fishing rod 10 in a position corresponding to the reel 11, so as to facilitate the motor 12 in driving the reel 11 to rotate. In certain exemplary embodiments, with reference to FIG. 3, the main body of the fishing rod 10 is retractable or deployable. The main body of the fishing rod 10 comprises sub-rob bodies which nested one-by-one. Before the use of the fishing rod 10, a plurality of sub-rob bodies are retracted into the sub-rob body having the maximum diameter at the tail portion. When in use, the sub-rob bodies are pulled out one by one. In addition, in certain exemplary embodiments, the fishing rod 10 further comprises basic components such as a fishing line, a guide ring and a float etc. When in use, the sub-rob bodies are pulled out one by one, and the fishing line can pass through the guide ring (not shown).

The brainwave collection unit 20 is configured to collect the brainwave signal from a user of the fishing apparatus. In some embodiments, the brainwave collection unit 20 may be in the form of, e.g., a brainwave collection circuit, a head-mounted brainwave detector or sensor.

The control unit 30 is arranged to receive the brainwave signal collected by the brainwave collection unit 20, generating a motor control signal according to the brainwave signal, and transmitting the motor control signal to the motor 12. In some embodiments, the motor control signal may comprise a motor rotational speed signal indicative of the rotational speed of the motor and/or a motor rotational mode signal indicative of the rotational mode of the motor. The rotational mode may refer to, e.g., an unidirectional (such as forward or reverse) rotation, or a reciprocal (such as periodically direction-changing) rotation. The control unit 30 may be connected with the motor 12 and the brainwave collection unit 20 respectively wirelessly or via wire so as to transmit a signal thereto or receive a signal therefrom. In certain exemplary embodiments, the control unit 30 may be attached to the fishing rod 10 as a stand-alone device. Or the control unit 30 may be integrated with the fishing rod 10 or the brainwave collection unit 20 to facilitate the use of the fishing rod 10. In some embodiments, the control unit may be implemented by a control circuit, a controller or a processor, etc.

The motor 12 receives the motor control signal from the control unit 30 and drives the reel 11 in rotation under control of the motor control signal so as to retrieve or deploy the fishing line and therefore retrieve or deploy the fishing rod.

In some embodiments, the motor control signal comprises a first control signal for controlling the motor to drive the reel to rotate uni-directionally. In certain exemplary embodiments, the rotational direction of the motor 12 when receiving the first control signal may be determined according to the previous rotational direction of the motor 12. For example, if the rotational direction of the motor 12 after receiving a first control signal is forward (namely, the direction in which the fishing line is deployed), the rotational direction of the motor 12 when receiving the first control signal a second time is changed to be reverse (namely, the direction in which the fishing line is retrieved). Alternatively, after receiving the brainwave signal, the control unit 30 determines the rotational direction of the motor 12 according to the actual change of the brainwave signal. In addition, when the fishing rod 10 is in an initial use state, the rotational direction of the motor 12 may be default, e.g., the default rotational direction is the required rotational direction of the motor 12 when the fishing rod needs to be deployed.

According to the above embodiment, the fishing apparatus provided by the embodiment of the present disclosure is provided with the brainwave collection unit for collecting the brainwave signal from a user, and the control unit for generating the first control signal according to the brainwave signal, such that the motor may drive the reel to rotate according to the first control signal in order to retrieve and deploy a fishing line. Thus, it is possible for a user to control the rotation of the reel and the opportunity for retrieving and deploying the fishing rod according to a brainwave, and such a fishing apparatus is then easy to use and significantly labor-saving.

In some embodiments, the motor control signal may be generated according to the state reflected by the brainwave signal. It may be known from relevant technologies that there are generally four states when the human brain is working:

α wave (ALPHA/α wave): an oscillation frequency range of 8 Hz-14 Hz. If a brainwave is in this frequency range, a human brain is clear and relaxed with high concentration. At this time, people will not be easily disturbed by other things and brain is not easy to fatigue. Hence, α wave is a wave state most suitable for one to study and think efficiently.

β wave (BETA/β wave): an oscillation frequency range of 14 Hz-100 Hz, and more particularly 14 Hz-30 Hz. If a brainwave is in this frequency range, a human brain is conscious and tensioned. At this time, people are sensitive to surroundings and their attention is focused on external environment. As the proportion of β wave in the brainwave increases, a human body is gradually tensioned and ready to take action at any time in response to the external environment.

θ wave (THETA/θ wave): an oscillation frequency range of 4 Hz-8 Hz. If a brainwave is in this frequency range, a human brain is in a light-sleep and meditation state. That is to say, θ wave typically occurs when people get tired.

δ wave (DELTA/δ wave): an oscillation frequency range of 0.5 Hz-4 Hz. If a brainwave is in this frequency range, a human brain is in a sound and dreamless sleep state.

Thus, in some optional implementations, the control unit 30 is arranged to calculate the proportion of β wave in the brainwave signal. When the proportion of β wave reaches a first preset proportion threshold, it indicates that the user is currently in a tensioned state, which means it's necessary to perform the rod deployment or rod retrieval operations. In response, the control unit 30 generates the first control signal, which controls the motor 20 to drive the reel to rotate.

A brainwave signal is a signal that has amplitude (e.g., voltage amplitude) varying with time. In some embodiments, a characteristic peak may be extracted from the collected brainwave signal and decomposed into waves in corresponding frequency ranges (such as α wave, β wave, θ wave and δ wave) for spectral analysis. The proportion of β wave may be calculated by calculating the ratio of β wave in the brainwave signal. Similarly, the proportion of a wave in other frequency ranges may also be calculated by calculating the ratio of the wave in the other frequency ranges in the brainwave signal.

In a relevant technology, when deploying and retrieving the fishing rod, the user needs to manually control the reeling speed and meanwhile pay much attention to the state of the float. It is also necessary to keep the rod body stable while reeling, which requires lots of experiences and skills and takes great physical energy to succeed. According to the present embodiment, the user may control his/her own mental status so as to control the proportion of β wave in his/her brainwave, thereby controlling the rotation of the reel by the brainwave signal.

The first preset proportion threshold may be an empirical value, or selected by means of experiments. In certain exemplary embodiments, the first preset proportion threshold may be obtained by training the user to control the rotation of the reel with their mind before using the fishing apparatus, collecting and processing brainwave signals of the user during the training, calculating proportions of β wave in brainwave signals collected when the user is controlling the rotation of the reel, and using the minimum proportion of β wave as the first preset proportion threshold.

Moreover, at the initial phase during which the user deploys the fishing line from the reel after the fishing rod has been cast, the control unit 30 is further arranged, in a preset time period, to control the motor 12 to drive the reel 11 to rotate at a faster speed so as to complete the rod deployment as soon as possible.

In some optional implementations, the motor control signal comprises information, e.g., a motor rotational speed signal, indicative of the rotational speed of the motor. In some embodiments, the control unit 30 is further arranged to change the motor rotational speed signal carried in the motor control signal according to the change of difference between the proportion of β wave and the first preset proportion threshold. Exemplarily, if, after rod deployment, the proportion of β wave in the user's brainwave signal gradually declines and becomes steady, the motor rotational speed signal may instruct that the reel may rotate at a slower and uniform speed. If, after rod deployment, the proportion of β wave in the user's brainwave signal does not show an obvious declining trend, the motor rotational speed signal may instruct that the reel continues to rotate at a faster speed. In doing so, the fun of fishing would not be decreased due to the reduced active manual control of the fishing rod by the user.

In some optional implementations, the motor control signal comprises a second control signal used to control the motor to drive the reel to rotate reciprocally between a forward direction and a reverse direction. In these embodiments, the control unit 30 may be arranged to generate the second control signal when the proportion of β wave reciprocally changes centered around a second preset proportion threshold. The motor 12 drives the reel 11 to rotate reciprocally according to the second control signal. Thus, after the rod deployment, the user may continue controlling the reel 11 to rotate reciprocally using his brainwave signal, so as to control the fishing rod 10 to retract and deploy slowly, which will imitate an illusion of natural bait to entice a fish to bite.

The second preset proportion threshold may be an empirical value, or selected by means of experiments. In certain exemplary embodiments, the second preset proportion threshold may be obtained by training the user to control the reciprocal rotation of the reel with their mind, collecting and processing brainwave signals of the user during the training, calculating proportions of β wave in brainwave signals collected when the user is controlling the reciprocal rotation of the reel, and using the mean values of the proportions of β wave as the second preset proportion threshold.

The fishing apparatus according to the embodiment of the present disclosure allows a user to control rotation of the reel and the opportunity for retrieving and deploying the fishing rod according to a brainwave. This makes the fishing apparatus be easily used, thus being significantly labor-saving.

Figure 2:
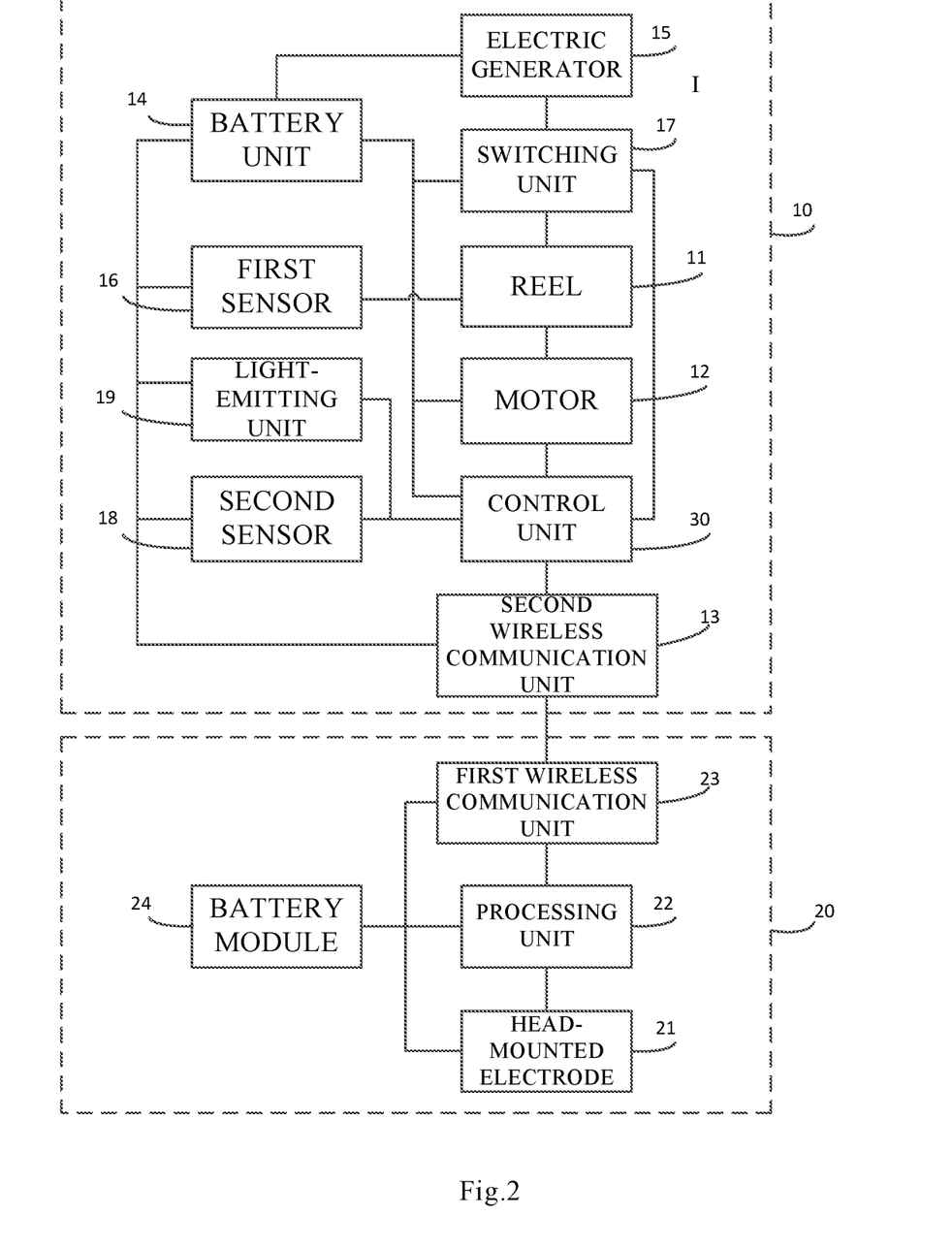
FIG. 2 is a structural schematic view of a fishing apparatus according to another embodiment of the present disclosure.

FIG. 2 is a structural schematic view of a fishing apparatus according to another embodiment of the present disclosure. With reference to FIG. 2, the brainwave collection unit 20 comprises at least two head-mounted electrodes 21; a processing unit 22; and a first wireless communication unit 23.

The head-mounted electrodes 21 are worn on a user's head for collecting the brainwave. In certain exemplary embodiments, the number of the head-mounted electrodes 21 may be selected as required (for instance, the number is greater than or equal to 2) so as to collect more accurate and comprehensive brainwaves.

The processing unit 22 is connected with the head-mounted electrodes 21 so as to receive the brainwave collected by the head-mounted electrodes and process the brainwave to obtain the brainwave signal.

The first wireless communication unit 23 is connected with the processing unit 22 so as to receive the brainwave signal from the processing unit. The first wireless communication unit 23 is wirelessly connected with the control unit 30 so as to transmit the brainwave signal to the control unit 30.

In certain exemplary embodiments, the fishing rod 10 may also be provided with a second wireless communication unit 13 for wireless communication with the first wireless communication unit 23. In certain exemplary embodiments, the first wireless communication unit 23 and the second wireless communication unit 13 may be in a form of infrared transceiver modules so as to communicate via infrared signals.

In certain exemplary embodiments, the brainwave collection unit 20 may further comprise a battery module 24 for supplying power to various components of the brainwave collection unit 20.

After the user puts on the head-mounted electrodes 21, a wireless, interactive connection control is implemented by means of the first wireless communication unit 23 and the second wireless communication unit 13 of the fishing rod 10. The head-mounted electrodes 21 collect the user's brainwave signal. After casting the fishing rod and the float gets stable, the user only needs to pay constant attention to the end of the fishing rod 10 which points to the water surface. The control unit 30 obtains the proportion of β wave by processing the brainwave signal collected by the head-mounted electrodes 21, and therefore knows the current status of the user's brain. The control unit 30 may give an instruction according to the current status of the user's brain to control and adjust the rotational speed and rotational direction of the motor, and finally controls the rotation of the reel for retrieving and paying out the fishing line. Thus, the user may freely control the retrieval and deployment of the fishing line through the brainwave during the fishing process, with no need of manually reeling the fishing line.

Thus, when using the fishing apparatus, the user is provided with at least two head-mounted electrodes 21 on his/her head for collecting and detecting the brainwave. The detected brainwave is processed by the processing unit 22, transmitted by the first wireless communication unit 23 to the control unit 30 for information matching, and later a corresponding instruction is sent out to implement the automatic control of the reel. In this way, the user may concentrate more on whether a fish bites the hook, thereby reducing lots of other work and significantly improving the fishing success rate.

In some optional implementations, as shown in FIG. 2, the fishing apparatus further comprises a battery unit 14 and an electric generator unit 15.

The battery unit 14 provides power to the fishing apparatus, e.g., its various components. In certain exemplary embodiments, the battery unit 14 is disposed within the body of the fishing rod 10 so as to make the entire fishing rod 10 more integrated and compact.

The electric generator unit 15 is connected with the reel 11 and electrically connected with the battery unit 14 in order to convert mechanical energy generated by rotation of the reel 11 to electrical energy so as to be stored in the battery unit 14. In doing so, the mechanical energy generated by rotation of the reel 11 may be recycled. In certain exemplary embodiments, the electric generator unit 15 is implemented by a mini-generator and disposed within the body of the fishing rod 10 so as to make the entire fishing rod 10 more integrated and compact.

In some optional implementations, as shown in FIG. 2, the fishing apparatus further comprises a first sensor unit 16 and a switching unit 17.

The first sensor unit 16 is disposed on the reel 11 and electrically connected with the control unit 30, and is arranged to transmit a first sensor signal generated when a user grips the handle 111 of the reel to the control unit 30. In certain exemplary embodiments, the first sensor unit may be implemented by a photosensitive sensor and disposed on the handle 111 of the reel 11. Thus, when the user grips the handle 111, the photosensitive sensor may generate a changed first sensor signal, which is transmitted to the control unit 30. Alternatively, the first sensor unit may also be a pressure sensor for sensing the gripping force applied to the handle when the handle is held by the user, and correspondingly generating the first sensor signal.

After processing the changed first sensor signal, the control unit 30 knows the current user is gripping the handle 111 of the reel 11, and then predicts that the user is going to reel the fishing line by manually rotating the reel 11 to retrieve rod.

The control unit 30 is electrically connected with a switching unit 17 so as to send a third control signal to the switching unit 17 according to the first sensor signal.

The switching unit 17 is disposed between the electric generator unit 15 and the reel 11, and is arranged to connect the electric generator unit 15 with the reel 11 or disconnect the electric generator unit 15 from the reel 11 according to the third control signal from the control unit 30. When it is switched to connect the electric generator unit 15 and the reel 11, the mechanical energy generated by manually reeling the fishing line by the user may be transferred to the electric generator unit 15 so as to be converted to electrical energy and stored in the battery unit 14.

The above embodiment makes it possible that when a user is manually reeling the fishing line, the mechanical energy generated by user manually reeling the fishing line may be converted to electric energy by the electric generator unit, which is advantageous to resource recycling and utilization.

In some optional implementations, as shown in FIG. 2, the fishing apparatus further comprises a second sensor unit 18 and a light-emitting unit 19.

The second sensor unit 18 is disposed at an end of the fishing rod 10 extending to a water surface, and is arranged to generate a second sensor signal when a fishing line is tugged and to transmit the second sensor signal to the control unit 30. In certain exemplary embodiments, the second sensor unit 18 may be a pressure sensor.

The control unit 30 is electrically connected with the light-emitting unit 19 so as to send a fourth control signal to the light-emitting unit 19 according to the second sensor signal.

The light-emitting unit 19 is disposed on an external surface of the fishing rod 10, and is arranged to emit light in response to the fourth control signal. In certain exemplary embodiments, the light-emitting unit 19 may be an LED lighting device.

When judging whether a fish bites a hook, the user usually needs to visually judge the inclination of the rod head and the displacement of the float, or make a subjective judgment according to his/her hand feeling. This requires high concentration and certain experience, and may make the user feel tired easily. However, in the present embodiment, by activating the second sensor unit 18 disposed at an end of the fishing rod 10 extending to a water surface, tug force on the fishing line is detected, and consequently, the fourth control signal is sent from the control unit 30 to the light-emitting unit 19 to light it up, thereby assisting the user in deciding when to retrieve the fishing rod. Herein, since judging whether a fish bites a hook is a complicated process in need of experience, it is still the user that decides when to retrieve the fishing rod. The second sensor unit 18 and the light-emitting unit 19 usually assist in making judgments so as to increase the accuracy. When the user judges that the fishing rod may be retrieved, he may control the brainwave generated in his/her brain to give the control unit 30 a rod retrieval signal, and the control unit transmits the first control signal to the motor to drive the reel 11 to rotate so as to help the user to retrieve the fishing rod. Moreover, although it is inconvenient to fish at night, the embodiments of present disclosure is especially suitable for fishing at night because of its illumination function.

In some optional implementations, the control unit 30 may further be arranged to send a fifth control signal to the switching unit 17 according to the second sensor signal. The switching unit 17 is further arranged to connect the electric generator unit 15 with the reel 11 according to the fifth control signal from the control unit 30, such that mechanical energy generated by rotation of the reel by a fish tugging the fishing line may be transferred to the electric generator unit 15 so as to be converted to electrical energy and stored in the battery unit 14.

In some optional implementations, the light-emitting unit 19 comprises a plurality of LEDs annularly disposed on the external surface of the fishing rod 10 and around it.

The control unit 30 may be arranged to calculate the current tug strength on the fishing line according to the second sensor signal, determine the number of LEDs to be lit according to the calculated tug strength, and send the fourth control signal to a corresponding LED(s). Thus, the more likely a fish is hooked, or the heavier a hooked fish is, the more LEDs will be lit. In this way, the user may intuitively obtain the information on whether a fish bites a hook so as to decide the opportunity to retrieve the fishing rod.

In some optional implementations, the control unit 30 calculates a proportion of θ wave in the brainwave signal, and sends the fourth control signal to the light-emitting unit 19 according to the second sensor signal when the proportion of θ wave reaches a third preset proportion threshold. If the user is detected as tired through the proportion of θ wave, the control unit 30 sends the fourth control signal to the light-emitting unit 19 according to the second sensor signal, such that the lighting of the light-emitting unit 19 gives a warning to the user to prevent him from missing the opportunity of rod retrieving. Further, in addition to allow the user to decide on the opportunity of retrieving the fish line and accordingly retrieve the rod at his/her own discretion, an automatic control may also be implemented in conjunction with the brainwave collection unit 20. In some embodiments, when the proportion of θ wave reaches the third preset proportion threshold, i.e., for example, it is detected that the user is too tired to make a judgment on the opportunity of retrieving the fish line, the first control signal may be sent to the motor according to the second sensor signal so as to drive the reel to rotate to retrieve the fishing rod.

The third preset proportion threshold may be an empirical value, or selected by means of experiments. In certain exemplary embodiments, the third preset proportion threshold may be obtained by: collecting brainwave signals of the user multiple times when the user is tired, calculating proportions of the θ wave when the user is tired, and using the minimum of the proportions of the θ wave as the third preset proportion threshold.

In some optional implementations, the embodiments of the fishing apparatus provided by the present disclosure are mainly suitable in case of fishing in salt water, so as to significantly improve the situation of repeated rod deployment and retrieval when fishing in salt water.

Figure 3:
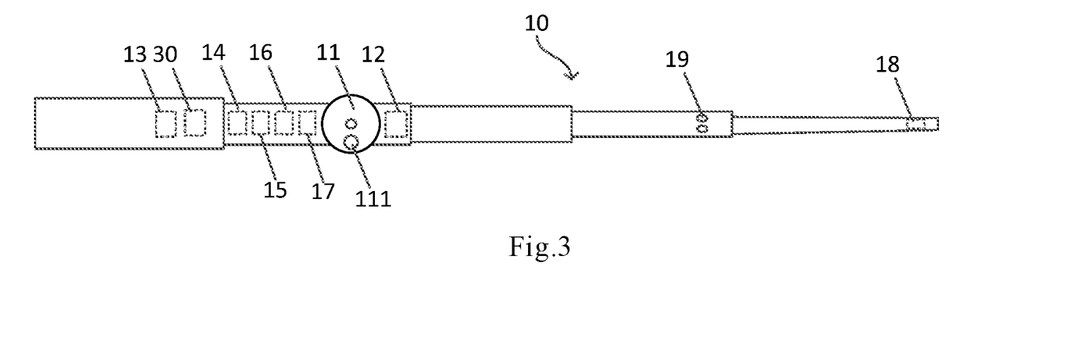
FIG. 3 is a structural schematic view of a fishing rod in a fishing apparatus according to a further embodiment of the present disclosure.

FIG. 3 is a schematic view of a fishing rod of a fishing apparatus according to a further embodiment of the present disclosure.

As shown in FIG. 3, the fishing rod 10 may consist of a hollow rod body and various components disposed inside or outside of the rod body. The rod body may be a multi-section rod-like object. The rod body has a grip at its tail portion and gradually tapers from the grip to its front end (namely, the end of the rod body extending to the water surface). The front end of the rod body is attached with a fishing line having a hook hanging at its distal end. The rod body may be made of various suitable materials, including, but not limited to, bamboo, glass fibers or carbon fibers.

The components include the reel 11 and the motor 12 connected with the reel 11. The reel 11 is disposed at the external surface of the fishing rod 10, and, in certain exemplary embodiments, close to the tail end (namely, the grip end) of the rod body. In some embodiments, as shown in FIG. 3, the reel 11 has a handle 111 to facilitate the user to retrieve and deploy the fishing line by rotating the reel.

The motor 12 in operation drives the reel 11 in rotation either in a forward direction, or a reverse direction. In some embodiments, the motor 12 is disposed within the rod body of the fishing rod 10, and, in certain exemplary embodiments, close to the reel 11. In some embodiments, the motor 12 may be a speed-adjustable motor.

The components may also include a second wireless communication unit 13 for receiving a signal from outside or sending a signal to the outside. In certain exemplary embodiments, the second wireless communication unit 13 is disposed at the tail end (namely, the grip end) of the rod body so as to get closer to the user for receiving the brainwave signal or a relevant control signal(s). In some embodiments, the second wireless communication unit 13 may be an infrared transceiver. Alternatively, the second wireless communication unit 13 may also be a Bluetooth transceiver. Correspondingly, the first wireless communication unit 23 in communication therewith may also be a Bluetooth transceiver.

The control unit 30 may be integrated onto the fishing rod 10. In certain exemplary embodiments, the control unit 30 may be disposed within the rod body of the fishing rod 10. In certain exemplary embodiments, with reference to FIG. 3, the control unit 30 may be disposed at the tail portion of the fishing rod 10, which, on the one hand, balances the weight of the fishing rod 10 as a whole, and on the other hand, facilitates the data exchange between the control unit 30 and the brainwave collection unit 20.

In some embodiments, the components may also include one or more of the following: a battery unit 14 for supply power to components of the fishing apparatus, an electric generator unit 15 for converting the mechanical energy to the electrical energy and storing the electrical energy in the battery unit 14, a first sensor unit 16 for sensing gripping of the handle of the reel by the user and generating the first sensor signal, a switching unit 17 for implementing connection between the generator unit 15 and the reel 11 or disconnection of the electric generator unit 15 from the reel 11, and a second sensor unit 18 for sensing tug on the fishing line and generating the second sensor signal.

In some embodiments, as shown in FIG. 3, the battery unit 14, the electric generator unit 15, the first sensor unit 16, the switching unit 17 and the second sensor unit 18 may be disposed within the rod body of the fish rod 10. In certain exemplary embodiments, the battery unit 14, the electric generator unit 15, the first sensor unit 16 and the switching unit 17 may be disposed in the middle section of the rod body, and the second sensor unit 18 may be disposed at the front end of the rod body.

In some embodiments, the components may also include a light-emitting unit 19 for emitting light in response to the control signal. In certain exemplary embodiments, the light-emitting unit 19 is disposed on the external surface of the rod body so as to provide the user with a visual instruction by means of emitting light. In certain exemplary embodiments, the light-emitting unit 19 comprises a plurality of LEDs annularly disposed on the external surface of the rod body.

Figure 4:
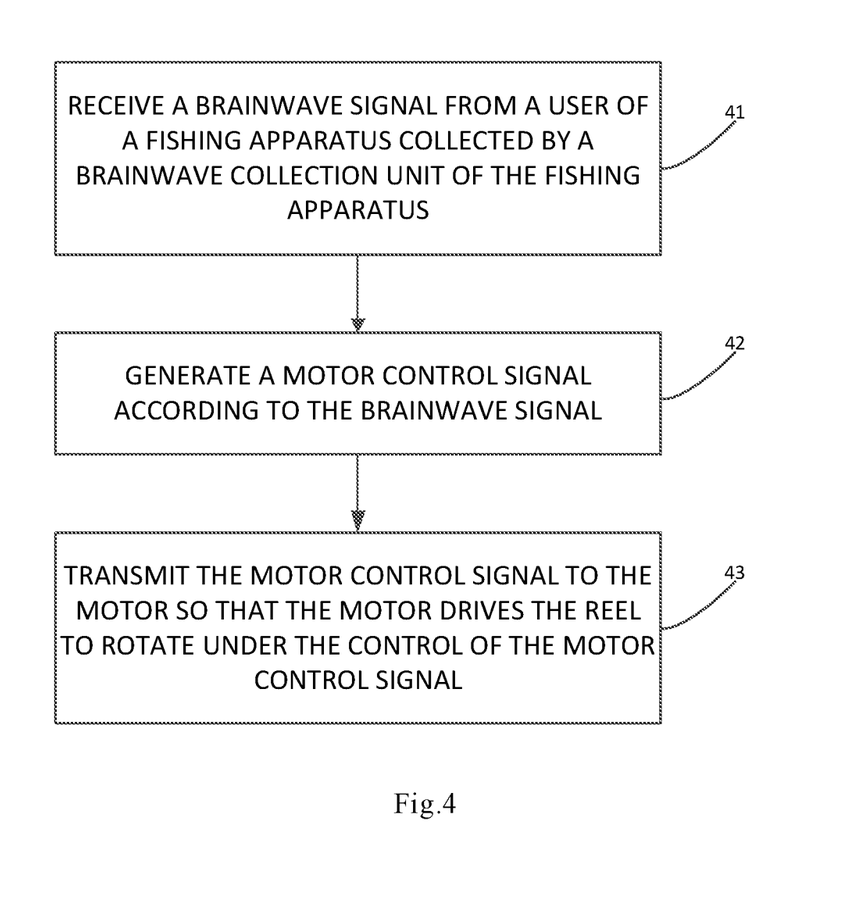
FIG. 4 is a flowchart illustrating a method for controlling a fishing apparatus according to an embodiment of the present disclosure.

According to the second aspect of the embodiment of the present disclosure, there is provided an embodiment of a method for controlling a fishing apparatus. FIG. 4 is a flowchart illustrating a method for controlling a fishing apparatus according to an embodiment of the present disclosure. The fishing apparatus may be the one described with reference to FIGS. 1 to 3. The fishing apparatus may comprise a fishing rod that includes a reel and a motor connected with the reel.

The method for controlling a fishing apparatus comprises: Step 41: receiving a brainwave signal from a user of a fishing apparatus collected by a brainwave collection unit of the fishing apparatus; Step 42: generating a motor control signal according to the brainwave signal; and Step 43: transmitting the motor control signal to the motor so that the motor drives the reel to rotate under the control of the motor control signal.

As can be seen from the above embodiment, the method for controlling a fishing apparatus provided by the embodiment of the present disclosure collects the brainwave signal of the user, generates the motor control signal according to the brainwave signal, and enables the motor to drive the reel to rotate according to the motor control signal so as to achieve the retrieval and deployment of the fishing line. Thus, it is possible for the user to control rotation of the reel and the opportunity for retrieving and paying out the fishing line via his/her brainwave, and such a fishing apparatus is easy to use and extremely labor-saving.

In some optional implementations, the motor control signal comprises a first control signal for controlling the motor to drive the reel to rotate uni-directionally. The method for controlling the fishing apparatus further comprises: calculating a proportion of $\beta$ wave in the brainwave signal according to the collected brainwave signal. When the proportion of $\beta$ wave reaches a first preset proportion threshold, it indicates that the user is currently in a tensioned state, which means it is required to deploy or retrieve the fishing rod, and then the first control signal is generated. In the present embodiment, the user may control the proportion of $\beta$ wave in his/her brainwave by controlling his/her mental state, thereby controlling the rotation of the reel via the brainwave signal.

In some optional implementations, the method for controlling the fishing apparatus further comprises calculating a proportion of $\theta$ wave in the brainwave signal. When the proportion of $\theta$ wave reaches a third preset proportion threshold, it indicates that the user is in a fatigue state. At this point, in response to the second sensor signal generated by the second sensor disposed at an end of the fishing rod extending to the water surface, the control unit sends a fourth control signal to the light-emitting unit disposed on the external surface of the fishing rod. In this way, in addition to allowing the user to make judgment on the opportunity for retrieving the fish line and then accordingly retrieve rod at his/her own discretion, an automatic control may also be implemented in conjunction with the brainwave collection unit 20. If the user is detected to be in a fatigue state through the proportion of $\theta$ wave, the control unit 30 sends the fourth control signal to the light-emitting unit 19 according to the second sensor signal, such that the lighting of the light-emitting unit 19 gives a warning to the user to prevent him from missing the opportunity of rod retrieving.

In some optional implementations, the method for controlling a fishing apparatus further comprises: changing the motor rotational speed signal carried in the first control signal according to the change of the difference between the proportion of β wave and the first preset proportion threshold. That is, if, after rod deployment, the proportion of β wave in the user's brainwave signal gradually declines and becomes steady, the reel may maintain a slower uniform rotation. If, after rod deployment, the proportion of β wave in the user's brainwave signal does not show an obvious declining trend, the reel continues to rotate at a faster speed. In doing so, the fun of fishing would not be decreased due to the reduced active manual control of the fishing rod by the user In some optional implementations, the motor control signal comprises a second control signal used to control the motor to drive the reel to rotate reciprocally between a forward direction and a reverse direction. The method for controlling a fishing apparatus further comprises generating the second control signal when the proportion of β wave reciprocally changes centered around a second preset proportion threshold. The motor drives the reel to rotate reciprocally according to the second control signal. Thus, after completing the rod deployment, the user may continue controlling the reel 11 to rotate reciprocally through his/her brainwave signal. In this way, the fishing rod 10 is controlled to deploy and retrieve slowly, which imitates an illusion of natural bait in order to entice a fish to bite.

Figure 5:
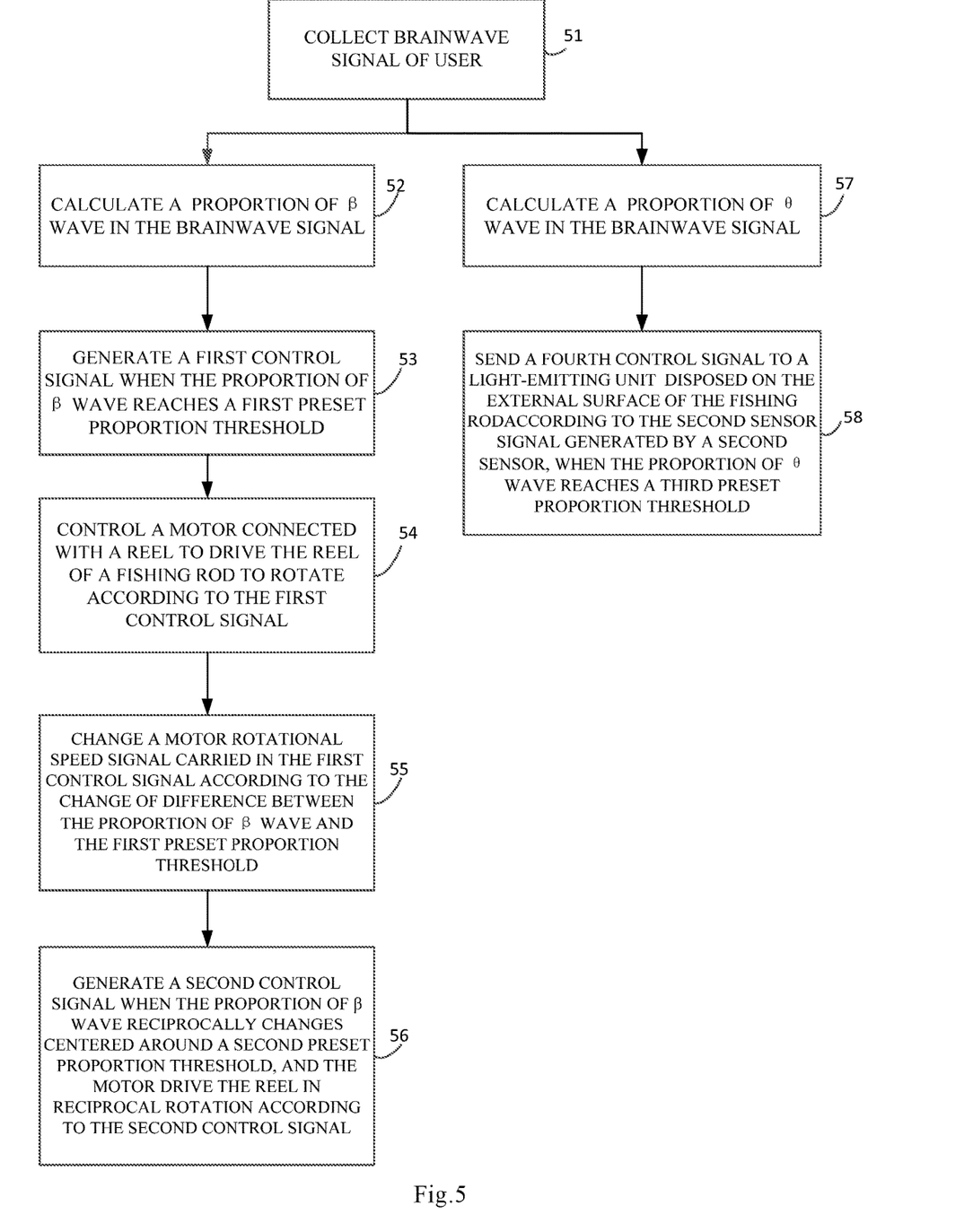
FIG. 5 is a flowchart illustrating a method for controlling a fishing apparatus according to another embodiment of the present disclosure.

The embodiment of the present disclosure provides another method for controlling a fishing apparatus. As shown in FIG. 5, it is a flowchart illustrating the method for controlling a fishing apparatus according to another embodiment of the present disclosure.

In certain exemplary embodiments, the method for controlling a fishing apparatus is applied to any of embodiments of the afore-said fishing apparatus, comprising:

Step 51: collecting a brainwave signal of a user;

Step 52: calculating a proportion of β wave in the brainwave signal;

Step 53: generating a first control signal when the proportion of β wave reaches a first preset proportion threshold;

Step 54: controlling a motor connected with a reel of a fishing rod to drive the reel in rotation according to the first control signal;

Step 55: changing a motor rotational speed signal carried in the first control signal according to the change of difference between the proportion of β wave and the first preset proportion threshold;

Step 56: generating the second control signal when the proportion of β wave reciprocally changes centered around a second preset proportion threshold;

Step 57: calculating the proportion of θ wave in the brainwave signal; and

Step 58: when the proportion of θ wave reaches a third preset proportion threshold, sending a fourth control signal to the light-emitting unit disposed on the external surface of the fishing rod according to a second sensor signal, which is generated by a second sensor disposed at an end of the fishing rod extending to the water surface.

As can be seen from the above embodiment, the method for controlling a fishing apparatus provided by the embodiment of the present disclosure collects the brainwave signal of the user, generates the control signal according to the brainwave signal, and enables the motor to drive the reel to rotate according to the control signal, such that the user may automatically control the reel to achieve various functions according to the brainwave signal, and such a fishing apparatus is easy to use and extremely labor-saving.

Those ordinarily skilled in the art may understand that the discussion of any above embodiment is merely exemplary, and not intended to imply that the scope of the present disclosure (including the claims) is limited to those examples. Under the idea of the present disclosure, the above embodiments or technical features in different embodiments may be combined, and the steps may be carried out in any sequence. There are many other variations of the present disclosure in different aspects, which will not be reiterated for the sake of brevity.

The term "controller" or "control unit" is generally used herein to describe various devices associated with one or more operations. The controller or control unit may be implemented in many ways (e.g., such as use a dedicated hardware, circuitry) to perform the various functions discussed herein. A "processor" is an example of a controller or control unit that employs one or more microprocessors that may be programmed using software (e.g., microcode) to perform the various functions discussed herein. The controller or control unit may be implemented with or without a processor, and may also be implemented as the combination of the dedicated hardware which performs some functions and processors which perform other functions (e.g., one or more programmed microprocessors and associated circuitry). Examples of controller or control unit components that may be employed in various embodiments of the present disclosure include, but are not limited to, conventional microprocessors, application specific integrated circuits (ASICs), and field programmable gate arrays (FPGAs).

In various implementations, a processor or controller may be associated with one or more storage media (generally referred to herein as "memory" such as volatile and non-volatile computer memory such as RAM, PROM, EPROM, and EEPROM, floppy disk, compact disk, optical disk, tape, etc.). In some implementations, the storage medium may be encoded with one or more programs that, when executed on one or more processors and/or controllers, perform at least some of the functions discussed herein. Various storage media may be fixed in a processor or controller or may be removable so that one or more programs stored thereon may be loaded into a processor or controller so as to implement various aspects of the present invention discussed herein. The term "program" or "computer program" is used herein in a generic sense to refer to any type of computer code (e.g., software or microcode) that may be employed to program one or more processors or controllers.

Each functional unit in each embodiment of the present disclosure may be integrated in one processing module, or each element may exist alone physically, or two or more elements may be integrated in one module. The above integrated module may be implemented in the form of hardware or in the form of a software function module. The integrated module may also be stored in a computer readable storage medium, if it is implemented in the form of a software functional module and sold or used as a stand-alone product.

The storage medium as mentioned above may be a read-only memory, a disc or a compact disc, etc.

It should be noted that the embodiments as mentioned above are not intended to limit the present invention, and without departing from the scope of the claims, those skilled in the art may design many alternative embodiments. In the claims, any reference sign in parentheses should not be interpreted as a limitation to the claims. The verb "comprise/include" and the variants thereof do not exclude the presence of elements or steps other than those listed in the claims. The word "a" or "an" in front of elements does not exclude the presence of a plurality of such elements. The present invention may be implemented by means of hardware comprising several different elements, and by means of suitably programmed computers. In device claims that enumerate several means, one or more of the means may be embodied in one and the same item of hardware. The fact that only some measures are recited in mutually different dependent claims does not mean that the combination of those measures cannot be utilized advantageously.

It should also be understood that unless pointed out contrarily, in any claimed method comprising more than one step or action, the sequence of the steps or actions of the method is not necessarily limited to the one as enumerated. In addition, any reference sign or other symbol in parentheses are merely provided for convenience and is not intended to impose any limitation to the claims in any manner.

The invention claimed is:

1. A fishing apparatus, comprising:
    a fishing rod, wherein the fishing rod comprises a reel and a motor connected to the reel;
    a brainwave collection unit, wherein the brainwave collection unit is arranged to collect a brainwave signal from a user of the fishing apparatus; and
    a control unit, wherein the control unit is arranged to receive the brainwave signal collected by the brainwave collection unit, generate a motor control signal according to the brainwave signal, and transmit the motor control signal to the motor,
    wherein the motor drives the reel to rotate under the control of the motor control signal;
    wherein the motor control signal comprises a first control signal for controlling the motor to drive the reel to rotate uni-directionally, and
    the control unit is arranged to calculate a proportion of beta (β) waves in the brainwave signal according to the collected brainwave signal, and to generate the first control signal when the proportion of β wave reaches a first preset proportion threshold and indicates that the user is currently in a tensioned state.

2. The fishing apparatus according to claim 1, wherein the motor control signal comprises a motor rotational speed signal indicative of a rotational speed of the motor or a motor rotational mode signal indicative of the rotational mode of the motor.

3. The fishing apparatus according to claim 2, wherein the control unit is further arranged to change the information indicative of the rotational speed of the motor according to a difference between the proportion of β wave and the first preset proportion threshold.

4. The fishing apparatus according to claim 1, wherein the control unit is arranged to obtain the first preset proportion threshold by:
    training the user to control the unidirectional rotation of the reel with their mind, collecting and processing brainwave signals of the user during the training, calculating proportions of β wave in brainwave signals collected when the user is controlling the rotation of the reel, and using a minimum of the proportions of β wave calculated when the user is controlling the rotation of the reel as the first preset proportion threshold.

5. The fishing apparatus according to claim 1, wherein the motor control signal comprises a second control signal used to control the motor to drive the reel to rotate reciprocally between a forward direction and a reverse direction, and the control unit is further arranged to generate the second control signal when proportions of β wave reciprocally change centered around a second preset proportion threshold.

6. The fishing apparatus according to claim 5, wherein the control unit is arranged to obtain the second preset proportion threshold by:
    training the user to control reciprocal rotation of the reel with their mind, collecting and processing brainwave signals of the user during the training, calculating proportions of β wave in brainwave signals collected when the user is controlling the reciprocal rotation of the reel, and using a mean value of the proportions of β wave collected when the user is controlling the reciprocal rotation of the reel as the second preset proportion threshold.

7. The fishing apparatus according to claim 1, wherein the brainwave collection unit comprises:
    at least two head-mounted electrodes, being arranged to, when being worn on the user's head, collect brainwaves of the user;
    a processing unit, wherein the processing unit is arranged to receive the brainwaves collected by the head-mounted electrodes and process the brainwaves to obtain the brainwave signal; and
    a wireless communication unit being arranged to receive the brainwave signal from the processing unit and transmit the brainwave signal to the control unit through wireless connection with the control unit.

8. The fishing apparatus according to claim 1, further comprising:
    a battery unit, being arranged to provide power to the fishing apparatus; and
    an electric generator unit connected with the reel and electrically connected with the battery unit, wherein the electric generator unit is arranged to convert mechanical energy generated by rotation of the reel to electrical energy so as to be stored in the battery unit.

9. The fishing apparatus according to claim 8, further comprising a first sensor unit and a switching unit;
    wherein the first sensor unit is disposed on the reel and electrically connected with the control unit, and is arranged to generate a first sensor signal when it senses griping of a handle of the reel by the user, and transmit the first sensor signal to the control unit;
    the control unit is arranged to send a third control signal to the switching unit according to the first sensor signal; and
    the switching unit is disposed between the electric generator unit and the reel, and is arranged to connect the electric generator unit with the reel in response to the third control signal of the control unit.

10. The fishing apparatus according to claim 1, further comprising a second sensor unit and a light-emitting unit;
    wherein the second sensor unit is disposed at an end of the fishing rod extending to a water surface, and the second sensor unit is arranged to generate a second sensor signal when it senses that a fishing line of the fishing apparatus is being tugged and the second sensor unit is arrange to transmit the second sensor signal to the control unit;
    wherein the control unit is arranged to send a fourth control signal to the light-emitting unit according to the second sensor signal; and
    wherein the light-emitting unit is disposed on an external surface of the fishing rod, and is arranged to emit light in response to the fourth control signal.

11. The fishing apparatus according to claim 10, wherein the light-emitting unit comprises a plurality of LEDs disposed on the external surface of the fishing rod and around it; and the control unit is arranged to calculate the current tug strength on the fishing line according to the second sensor signal, determine a number of to-be-lit LEDs of the plurality of LEDs according to the calculated tug strength, and send the fourth control signal to the to-be-lit LEDs.

12. The fishing apparatus according to claim 10, wherein the control unit is arranged to calculate a proportion of theta (θ) wave in the brainwave signal according to the collected brainwave signal, and sends the fourth control signal to the light-emitting unit according to the second sensor signal only if the proportion of θ wave reaches a third preset proportion threshold and indicates that the user is in a tired state.

13. A method for controlling a fishing apparatus, the method comprising:

providing the fishing apparatus, the fishing apparatus comprising:
- a fishing rod, wherein the fishing rod comprises a reel and a motor connected to the reel;
- a brainwave collection unit, wherein the brainwave collection unit is arranged to collect a brainwave signal from a user of the fishing apparatus; and
- a control unit, wherein the control unit is arranged to receive the brainwave signal collected by the brainwave collection unit, generate a motor control signal according to the brainwave signal, and transmit the motor control signal to the motor, wherein the motor drives the reel to rotate under the control of the motor control signal;

wherein the motor control signal comprises a first control signal for controlling the motor to drive the reel to rotate uni-directionally, and the control unit is arranged to calculate a proportion of beta (β) waves in the brainwave signal according to the collected brainwave signal, and to generate the first control signal when the proportion of β wave reaches a first preset proportion threshold and indicates that the user is currently in a tensioned state;

the control unit receiving the brainwave signal of the user of the fishing apparatus collected by the brainwave collection unit of the fishing apparatus;

the control unit generating the motor control signal according to the brainwave signal; and the control unit transmitting the motor control signal to the motor so that the motor drives the reel to rotate under the control of the motor control signal.

14. The method according to claim 13, wherein the motor control signal comprises a second control signal used to control the motor to drive the reel to rotate reciprocally between a forward direction and a reverse direction, and the method further comprises: the control unit generating the second control signal when proportions of β wave reciprocally change centered around a second preset proportion threshold.

15. The method according to claim 13, further comprising:

the control unit sending a third control signal in response to a first sensor signal generated by a first sensor disposed on the reel so as to instruct a switching unit of the fishing apparatus to connect an electric generator unit with the reel for converting mechanical energy to electrical energy, wherein the first sensor generates the first sensor signal when it senses griping of a handle of the reel by the user.

16. The method according to claim 13, further comprising:

the control unit sending a fourth control signal in response to a second sensor signal generated by a second sensor disposed at an end of the fishing rod extending to a water surface so as to instruct a light-emitting unit disposed on an external surface of the fishing rod to emit light, wherein the second sensor generates the second sensor signal when it senses that a fishing line of the fishing apparatus is being tugged.

17. The method according to claim 16, further comprising:

the control unit calculating a proportion of θ wave in the brainwave signal; and the control unit sending the fourth control signal only if the proportion of θ wave reaches a third preset proportion threshold.

* * * * *